United States Patent Office
3,127,437
Patented Mar. 31, 1964

3,127,437
ORGANIC HALONITRATES AND METHOD OF PREPARATION
Walter Fink, Ruschlikon, Zurich, Switzerland, assignor to Monsanto Chemical Company, St. Louis, Mo., a corporation of Delaware
No Drawing. Filed Oct. 17, 1960, Ser. No. 62,881
Claims priority, application Switzerland Oct. 19, 1959
18 Claims. (Cl. 260—465.7)

This invention relates to the preparation of organic halonitrates many of which are novel compositions of matter that could not be economically prepared by the methods heretofore employed.

The organic halonitrates correspond to the following formula:

$$R^1\left[\begin{array}{c}R^2C-(R^5C=CR^6)_b-CR^3\\|\\ONO_2\end{array}\begin{array}{c}\\\\|\\hal\end{array}\right]_a R^4$$

In this formula $R^1$ is a hydrogen atom, a saturated or unsaturated aliphatic, cycloaliphatic, araliphatic, aromatic or heterocyclic radical, which may be attached by a heteroatom, particularly oxygen, nitrogen or sulfur, or by a heteroatom group and/or bear one or more substituents like halogen, oxy (=O), hydroxyl (—OH), alkoxy (—OR), especially lower (not more than 6 carbon atoms) alkoxy, thio (=S), thiol (—SH), alkylthio (—SR), amino (—NH$_2$, —NHR, —NRR′), imino (=NH, =NR), nitro (—NO$_2$), nitrilo (=N), sulfinyl (=SO), sulfo (—SO$_3$H), sulfamido (—SO$_2$NH$_2$, —SO$_2$NHR, —SO$_2$NRR′), etc. or possible combinations of these groups; $R^2$ is a halogen atom or has the same significance as $R^1$; $R^3$ is a hydroxyl, amino or thioradical or has the same significance as $R^2$; $R^4$ has the same significance as $R^1$; $R^5$ and $R^6$ are halogen atoms or aliphatic radicals; $a$ is an integer and $b$ is zero or an integer. The radicals $R^1$, $R^2$, $R^3$ and $R^4$ may also be interrupted by heteroatoms or heteroatom groups and/or be joined by a common atom or several atoms to a cyclic or heterocyclic ring. The order of the repetition $a$ eventually may be inversed.

The present invention is based on the discovery that organic halonitrates can be produced by effecting reaction between a halonitrate having the formula halNO$_3$, especially ClNO$_3$, and an organic compound containing at least one olefinic carbon to carbon double bond capable of undergoing addition reactions and corresponding to the general formula $$R^1(R^2C=CR^3)_a R^4$$

wherein $R^1$, $R^2$, $R^3$, $R^4$ and $a$ are defined as above. Preferred compounds are those having not more than about 3 olefinic double bonds and about 18 carbon atoms.

It was found that the halonitrate is added to the ethylenically-unsaturated double bond in such a manner, that are attached the nitrate constituent of the reacting halonitrate to one and the halogen constituent to the other of the unsaturated carbon atoms. In general, there are formed 1,2- or vicinal halonitrates showing the formula as set forth herein above and explained by the following representative equations:

CH$_2$=CH—CH$_2$—CH$_3$+ClNO$_3$
→ClCH$_2$—CH(NO$_3$)—CH$_2$—CH$_3$
CH$_2$=CH—C$_6$H$_5$+ClNO$_3$→ClCH$_2$—CH(NO$_3$)—C$_6$H$_5$
CH$_2$=CH—CH$_2$Cl+ClNO$_3$
→ClCH$_2$—CH(NO$_3$)—CH$_2$Cl

A preferred method of conducting the reaction between a halonitrate and an olefinic compound comprises adding with agitation a solution of the halonitrate in an inert solvent to the olefinic reactant which may also be dissolved, especially when being in a solid state. For example, halohydrocarbons such as commonly used as propellants are suitable solvents, thereby generally the low boiling solvents, e.g. CCl$_3$F, are preferred. It is understood that any presence of moisture in the reaction must be avoided. Upon removing of the solvent, the formed organic halonitrate can be isolated and purified in conventional fashion by fractional distillation or crystallization. However, it can also be used subsequently in the solvent. The reaction is suitably carried out at temperatures down to $-100°$ C., preferably between $-50°$ and $0°$ C.

The preferred "halonitrate" is chloronitrate. Fluoronitrate is a very explosive and poisonous compound, iodonitrate in view of the tendency of iodine to form a trinitrate rather than the desired mononitrate is only difficult to obtain. The prior art describes the preparation of fluoronitrate in an article by G. H. Cady in the Journal of the American Chemical Society 56, 2635 (1934), and the preparation of iodonitrate and bromonitrate in an article by Schmeisser, M. and Tagliner, L. in Angewandte Chemie 71, 523 (1959). Regarding these facts, chloronitrate is the most qualified reactant for carrying out the invention; but, of course, other halonitrates will react in similar manner.

For example, the necessary chloronitrate can be obtained by reacting nitrogen pentoxide (N$_2$O$_5$) with chlorine monoxide (Cl$_2$O) at low temperatures quantitatively according to the following equation:

$$N_2O_5 + Cl_2O \rightarrow 2ClNO_3$$

(M. Schmeisser, W. Fink and K. Brändle, Angew. Chem. 69, 780 (1957). Depending on the circumstances, it can also be prepared "in situ" in the reaction mixture of the invention.

Any olefinically-unsaturated hydrocarbon or heterocyclic compound capable of adding halonitrate can be used in the process of invention. The reactant can be a straight-chain, a branched-chain, or cyclic hydrocarbon having one or more points of ethylenic carbon to carbon unsaturation. Especially preferred, however, are the ethylenically-unsaturated hydrocarbons having between 2 and about 18 carbon atoms per molecule, and the terpenes, chiefly due to their availability.

Non limiting examples of the unsaturated aliphatic hydrocarbon reactant are: ethylene, propylene, butylene, isobutylene, isoamylene, 1,1,2-trimethylethene, hexene-1, hexene-3, 2-ethylbutene, isohexenes, 1,1-diethyl-2-methylethene, octene-2, octene-4, 2,4,4-trimethylpentene-2, diisobutylene, decene-1, triisobutylene, 2,4,4,6,6-pentamethylheptene, tetraisopropylene, dodecene-1, tridecene-1, tetradecene-1, pentadecene-1, hexadecene-1, octadecene-1, octadecene-9, tetra-n-butylethene etc.

Nonlimiting examples of the cycloaliphatic and araliphatic reactant are: cyclobutene, cyclopentene, cycloheptene, methylcyclohexene, 1,3-dimethylcyclohexene, camphene, menthene, pinenes, fenchene etc.; styrene, allylbenzene, butenylbenzene, 1,1-diphenylethene, stilbene etc.

Non limiting examples of the unsaturated heterocyclic compound are: furan, dihydrofuran, dihydrothiophene, pyrroline, pyran, thiopyran, dioxine, dithiene, thioxine, crotonlactene, maleic acid anhydride, maleic acid imide, coumarin, coumarone, thiocoumarin, chromene, flavene, thioflavene, α-difuryl-ethene, 1,1-phenyl-α-pyridylethene, 1-phenyl-4-γ-pyridylbutadiene-1,3, benzylidenerhodanine, methylene-bis-antipyrine, 1-phenyl - 3 - methyl-4-benzylidenepyrazolone - 5, benzylidenechinaldine, isochinophthalone, benzylidenecoumaranone, benzylidenehydantoine, benzylidene-indoxyl, benzylidenexanthene, naphthopyran etc.

If a compound has two or more olefinic double bonds, there can be added depending upon the stoichiometric ration of the reactants, either one or several molecules of halonitrate. Thus, butadiene-1,3 by reaction with an equimolar amount of chloronitrate leads to the chlorobutenenitrate and with a double equimolar amount of chloronitrate to the 2,3-dichloro-1,3-butyldinitrate. The equations that cover this particular case may be written as follows:

$$CH_2=CH-CH=CH_2+ClNO_3$$
$$\rightarrow NO_3CH_2-CH=CH-CH_2Cl$$
$$CH_2=CH-CH=CH_2+2ClNO_3$$
$$\rightarrow NO_3CH_2-CH(Cl)-CH(NO_3)-CH_2Cl$$

A generic formula for the products of these two reactions is as follows:

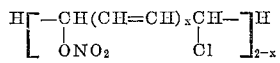

wherein X is 0 or 1.

In the reaction involving olefins having conjugated double bonds, the above indicated positions of the added halonitrate constituents is not always exactly the same. Isomeric compounds showing the following formulas, likewise, are possible:

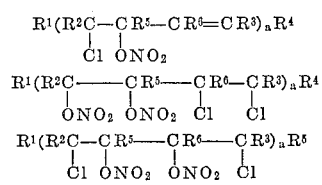

In these formulas $R^1$, $R^2$, $R^3$, $R^4$, $R^5$, $R^6$ and $a$ have the earlier defined significance. The formation of isomeric products is depending on the presence and distribution of electron-withdrawing groups such as halogen, carbonyl, cyano etc. and/or electron-supplying groups such as alkyl, acetoxy etc. in the unsaturated starting compound. It will be readily appreciated that these isomeric reaction products are not different in kind.

Examples of the hydrocarbon having two or more points of ethylenic carbon to carbon unsaturation which may be suitable to put into practice the present invention are: butadiene-1,3, isoprene, pentadiene-1,2, 2-methyl - 3 - methylbutadiene, diallyl, dipropylene, cyclohexadiene-1,3, cyclohexadiene-1,4, 1-methylcyclohexadiene-1,4, cycloheptatriene, cyclooctatetraene, dicyclopentadiene, 1,2 - dimethylcyclohexadiene, 1,3 - dimethylcyclohexadiene, dipentene, terpinenes, cymene, 1,4-dimethylcyclohexadiene, 2,5-dimethyl - 3,4 - diisopropylhexadiene-2,4, menthadiene, squalene etc.

As mentioned before, these unsaturated hydrocarbons may also be interrupted by heteroatoms, particularly oxygen, nitrogen or sulfur. Some illustrative examples are: divinyl ether, divinyl sulfide, diallyl ether, diallyl sulfide, diallyl disulfide, N - allyldimethylamine, ethyl propenyl ether, ethyl isopropenyl ether etc.

Among the halogen derivatives of the herein enumerated compounds are particularly useful those having one or two halogens located on the olefinic double bond and showing the grouping

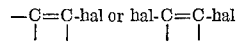

Such halogenated olefinic hydrocarbons are still capable of undergoing the addition reaction with a halonitrate. Thus, from chloroethylene, 1,2-dichloroethylene and 2-chloropropylene upon reaction with chloronitrate there are formed the novel compounds 1,2-dichloroethylnitrate, 1,2,2 - trichloroethylnitrate and 1,2 - dichloroisopropylnitrate according to the following equations:

$$CH_2=CHCl+ClNO_3\rightarrow ClCH_2-CH(Cl)NO_3$$
$$ClCH=CHCl+ClNO_3\rightarrow Cl_2CH-CH(Cl)NO_3$$
$$CH_2=C(Cl)-CH_3+ClNO_3\rightarrow ClCH_2-C(Cl)NO_3-CH_3$$

It may be noted that compounds of this type are not available by using the previous method of preparation which comprises effecting esterification between a corresponding hydroxyl compound and nitric acid, because the needed starting material bearing halogen and hydroxyl on the same carbon atom does not exist. Consequently, the present invention provides a useful method for preparing novel organic halonitrates which possess a halonitrate grouping attached to a carbon atom. Compounds of this kind display an unexpected and surprising behavior by treatment with catalytic amounts of $SnCl_4$. Thereby result the corresponding alpha-halo-aldehydes or alpha-halo-ketones.

Other unsaturated and substituted hydrocarbons which are particularly useful to put into practice the present invention are those having besides one or more olefinic carbon to carbon bonds at least one atom grouping which contains a carbon to heteroatom double or triple bond. Such atom groupings which promote the mobility of hydrogen, halogen etc. eventually being present on the neighboring carbon atom, are:

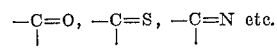

The compounds conforming to the above definition comprise unsaturated aldehydes, ketones, carbon acids, the amides, halogenides and esters thereof, the corresponding thiocompounds, in which an atom of sulfur replaces the carbonyl oxygen atom, nitriles etc.

Non limiting illustrative examples of the compound showing such a functional group are: acrolein, crotonaldehyde, tiglialdehyde, citronellal, citral, cinnamic aldehyde, piperonylacrolein, etc.; allylketone, vinylethylketone, allylacetone, ethylidenacetone, mesityloxide, phenylvinylketone, benzylidene-acetylacetone, styrylketone, benzylidene-acetophenone, cinnamylidene-acetone, dicinnamylidene-acetone, phorone, furfurylidene-acetone, acetylcoumarone, benzoyl-coumarone, benzylidene-acetoacetic acid ester, pyrone, 4,6-dimethyl-α-pyrone, 2,6-diphenyl-γ-pyrone, benzo-γ-pyrone, indigo, oxindigo, thioindigo, quinone, naphthoquinone, anthraquinone, diphenylchinomethane, tetraphenylchinomethane, carvone, jonone, flavone, chromone etc.; acrylic acid, crotonic acid, isocrotonic acid, methacrylic acid, β-vinylacrylic acid, allylacetic acid, angelic acid, tiglic acid, sorbic acid, diallylacetic acid, geranic acid, linoleic acid, linolenic acid, α-phenyl acrylic acid, β-styrylacrylic acid, phenylene-diacrylic acid, oleic acid, erucic acid, cinnamic acid, maleic acid, phenylmaleic acid, citraconic acid, phenylcitraconic acid, fumaric acid, itaconic acid, phenylitaconic acid, mesaconic acid, phenylmesaconic acid, vinylmalonic acid, allylmalonic acid, muconic acid, benzylidenemalonic acid, dihydroterephthalic acid, tetrahydroterephthalic acid, dihydrophthalic acid, tetrahydrophthalic acid, 2-furan-carbonic acid, 2,5-furandicarbonic acid, 2,3-furandicarbonic acid, 2-furanacrylic acid, the amides, esters and halogenides of these acids and the possible compounds in which a sulfur atom replaces the carbonyl oxygen atom; acrylonitrile, crotononitrile, allylcyanamide, 4-pentenenitrile, 2-furanacetonitrile, benzylideneacetonitrile, phenylacrylonitrile, benzylidene-cyano-acetic acid etc.

It is understood that may also be used in accordance to the invention the esters resulting from the esterification of any acid with an unsaturated alcohol such as allyl alcohol, crotonyl alcohol, cinnamyl alcohol etc.

Among the enumerated aldehydes, ketones, acids, nitriles etc. are particularly useful for the reaction with halonitrate those compounds, in which the olefinic unsaturation is conjugated to the carbonyl; thiocarbonyl or cyano group. It is stated that in the reaction with halonitrate, the nitrate constituent takes the position on he remote carbon atom of the double bond. Thus, the addition of the nitrate constituent is directed to the 3- or beta-position and the halogen constituent to the 2- or alpha-position with regard to the functional group. It is well known that the addition of hydrogen halide, on the contrary, leads to 3- or beta-haloderivatives.

The general scheme of reaction with, for example, chloronitrate and alpha-unsaturated compounds is illustrated as follows:

$$CH_2=CH-CHO + ClNO_3 \rightarrow NO_3CH_2-CH(Cl)-CHO$$
$$CH_2=CH-CN + ClNO_3 \rightarrow NO_3CH_2-CH(Cl)-CN$$
$$CH_2=CH-COOR + ClNO_3$$
$$\rightarrow NO_3CH_2-CH(Cl)-COOR$$

The resulting compounds show the unexpected and surprising property by treatment with KF at room temperature to split off their nitrate group. Thereby is formed an unsaturated compound, which only differs from the original compound in that a halogen is present on the alpha-carbon atom.

The following specific working examples are for the purpose of demonstrating the process of this invention and the products produced thereby. It must be strictly understood that this invention is not limited by the specific reactants utilized in the examples, or to the operations and manipulations involved. A wide variety of other reactants and conditions can be employed, as those skilled in the art will readily appreciate.

EXAMPLE 1

To a solution of 3 g. 1,3-butadiene in 20 ml. of $CCl_3F$ (B.P.$_{760}$ 23.8° C.; M.P. —111° C.) which is cooled at —50° are added gradually with stirring during a period of 20–30 minutes a solution of 12 g. $ClNO_3$ in 30 ml. of $CCl_3F$, any presence of moisture being excluded.

When the reaction is finished, the solvent is distilled off at about 0° C. under reduced pressure and the remaining almost colorless oil is subjected to the fractional distillation.

EXAMPLES 2–6

Using the same procedure as in Example 1, are obtained other organic halonitrates, their process data, yields and physical constants are listed in the following table.

Although the invention has been described in terms of specified embodiments which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A process for preparing organic halonitrates comprising reacting at a temperature of not more than about 0° C. in an inert solvent a compound having at least one but not more than three ethylenically-unsaturated double bonds and not more than about 18 carbon atoms with a halonitrate.

2. A process of claim 1 wherein the reacting halonitrate is chloronitrate.

3. A process of claim 2 wherein said compound is an ethylenically unsaturated hydrocarbon.

4. A process of claim 2 wherein said compound is 1,3-butadiene.

5. A process of claim 2 wherein said compound is vinyl chloride.

6. A process of claim 2 wherein said compound is acrolein.

7. A process of claim 2 wherein said compound is vinyl cyanide.

8. A process of claim 2 wherein said compound is ethyl acrylate.

9. A process of claim 2 wherein said compound is styrene.

10. A process for preparing organic halonitrates comprising reacting at a temperature of not more than about 0° C. in an inert solvent a compound having not more than about 18 carbon atoms of the formula $$R^1(R^2C=CR^3)_aR^4$$

Table 1

| | Organic reactant (I) | Conc. of (I) in the solvent, g./ml. | Conc. of $ClNO_3$ in the solvent, g./ml. | Temp. (° C.) | Yield (percent) | Product of reaction | Boiling point (° C./mm. Hg) | $n_D^{20}$ |
|---|---|---|---|---|---|---|---|---|
| 1 | $CH_2=CH-CH=CH_2$ | 0.15 | 0.40 | —50 | 81.8 | $NO_3CH_2-CHCl-CHNO_3-CH_2Cl$ | 91/2.5×10⁻¹ | 1.4901 |
| 2 | $CH_2=CHCl$ | 0.27 | 0.58 | —50 | 92.6 | $ClCH_2-CHCl-NO_3$ | 47/16 | |
| 3 | $CH_2=CH-C\overset{O}{\underset{H}{\diagdown}}$ | 0.20 | 0.30 | 0 | 93.1 | $NO_3-CH_2-CHCl-C\overset{O}{\underset{H}{\diagdown}}$ | 59–60/2.5×10⁻¹ | 1.4708 |
| 4 | $CH_2=CH-C\equiv N$ | 0.25 | 0.27 | —50 | 98.0 | $NO_3-CH_2-CHCl-C\equiv N$ | 70–75/2.5×10⁻¹ | 1.4775 |
| 5 | $CH_2=CH-\overset{O}{\underset{\|}{C}}-O-C_2H_5$ | 0.20 | 0.40 | —50 | 92.0 | $NO_3-CH_2-CHCl-\overset{O}{\underset{\|}{C}}-O-C_2H_5$ | 99–100/1.0×10⁻¹ | 1.4470 |
| 6 | $C_6H_5-CH=CH_2$ | 0.25 | 0.16 | 0 | 87.7 | $C_6H_5-CHNO_3-CH_2Cl$ | 75–76/2.0×10⁻² | 1.5350 |

NOTE.—In all reactions was used $CCl_3F$ as a solvent (B.P., 23.77° C./760 mm., M.P., —111° C.).

Table 2

| | Organic reactant (I) | Conc. of (I) in the solvent g./ml. | Conc. of $ClNO_3$ in the solvent, g./ml. | Temp. (°C.) | Yield (%) | Product of reaction | Boiling point (°C./mm. Hg) | $n_D^{20}$ |
|---|---|---|---|---|---|---|---|---|
| 7 | $(CH_3)_2C=CH_2$ | 0.2 | 0.40 | —50 | 50 | $(CH_3)_2C(NO_3)-CH_2Cl$ | 20–22/11 | 1.4114 |
| 8 | $CH_2=CH_2$ | 0.3 | 0.33 | —50 | 93 | $NO_3CH_2-CH_2Cl$ | 44.5–46.5/11 | |
| 9 | $CH_2=CH-C(O)CH_3$ | 0.2 | 0.52 | —40 | 73.5 | $NO_3CH_2-CHCl-C(O)CH_3$ | 38–40/5.0x10⁻² | 1.4655 |

The novel compounds are colorless or weakly yellowish liquids. They are useful as biological toxicants, especially as bactericides, fungicides and insecticides at concentration of less than 1%. By treatment with $SnCl_4$, KF or a base etc., they can be converted into valuable products. They also are intermediates for the manufacture of polymers.

wherein $a$ is an integer from 1 to 3, $R^1$ and $R^4$ are selected from the class consisting of hydrogen and hydrocarbon radicals free of olefinic and acetylenic unsaturation, $R^2$ is selected from the class consisting of halogens and $R^1$, and $R^3$ is selected from the class consisting of aldehyde, cyano, a lower alkyl carbonyl and lower alkyl carboxylate radicals and $R^2$, with a halonitrate.

11. A process of claim 10 wherein said halonitrate is chloronitrate.

12. Compounds having not more than 18 carbon atoms of the formula $$R^1\left[R^2C-(R^5C=CR^6)_b-CR^3\right]_a R^4$$
$$\quad\quad\;\;|\quad\quad\quad\quad\quad\quad\;\;|$$
$$\quad\quad ONO_2\quad\quad\quad\quad\;\; Cl$$

wherein $b$ is an integer from 0 to 2, $a$ is an integer from 1 to 3, $R^1$ and $R^4$ are selected from the class consisting of hydrogen and hydrocarbon radicals free of olefinic and acetylenic unsaturation, $R^2$ is selected from the class consisting of halogens and $R^1$, $R^3$ is selected from the class consisting of aldehyde, cyano, lower alkyl carbonyl and lower alkyl carboxylate radicals and $R^2$, provided $R^1$, $R^2$, $R^3$ and $R^4$ are not all hydrogen when $b$ is 0 and $R^5$ and $R^6$ are selected from the class consisting of hydrogen and hydrocarbon radicals free of olefinic and acetylenic unsaturation.

13. Compounds of the formula $$H\left[-CH(CH=CH)_xC(H)-\right]_{2-x} H$$
$$\quad\;\;|\quad\quad\quad\quad\quad\quad\;\;|$$
$$\quad ONO_2\quad\quad\quad\quad\quad Cl$$

wherein $x$ is 0 or 1.

14. $ClCH_2-CHCl-NO_3$.
15. $NO_3CH_2-CHCl-C(O)CH_3$.
16. $NO_3-CH_2-CHCl-CN$.
17. $NO_3-CH_2-CHCl-COOC_2H_5$.
18. $C_6H_5-CHNO_3-CH_2Cl$.

References Cited in the file of this patent
FOREIGN PATENTS 461,320      Great Britain _____ Feb. 10, 1937